United States Patent [19]
Long et al.

[11] Patent Number: 6,025,697
[45] Date of Patent: Feb. 15, 2000

[54] PROCESS FOR CHARGING A BATTERY AND BATTERY CHARGER TO ACHIEVE THE PROCESS

[75] Inventors: Marc Long; Michel Tonnelier, both of Paris; Michel Plaideau, Cresles, all of France

[73] Assignee: Sagem S.A., France

[21] Appl. No.: 09/069,181

[22] Filed: Apr. 29, 1998

[30] Foreign Application Priority Data

Apr. 29, 1997 [FR] France ................................ 97 05283

[51] Int. Cl.[7] .............................................. H01M 10/44
[52] U.S. Cl. ......................... 320/125; 320/137; 320/141
[58] Field of Search .................................... 320/125, 129, 320/130, 139, 140, 141, 137

[56] References Cited

U.S. PATENT DOCUMENTS

| 4,565,958 | 1/1986 | Cooper | 323/248 |
| 4,988,889 | 1/1991 | Oughton, Jr. | 323/222 |
| 5,359,280 | 10/1994 | Canter et al. | |
| 5,500,579 | 3/1996 | Kim et al. | |

FOREIGN PATENT DOCUMENTS 0 548 749  6/1993  European Pat. Off. .

*Primary Examiner*—Edward H. Tso
*Attorney, Agent, or Firm*—Pennie & Edmonds LLP

[57] ABSTRACT

The present invention relates to a process for charging a battery from an alternating current voltage which provides voltage to the battery in each direction. The charging current is regulated alternatively in a boost and buck mode as a function of an error (AI) between the instant value of the current and an instant value of a supply current following a pre-determined pattern. The activation of the modes of operation is controlled according to the sign of the error of the current (AI). The present invention also relates to a battery charger for implementing the above charging process. The battery charger has two sub-assemblies for current regulation operating respectively in boost and buck modes, a subtractor for determining the error of current, and a common loop for feeding the sub-assemblies and controlling amplifiers for the activation, depending on the sign of the error.

10 Claims, 2 Drawing Sheets

PROCESS FOR CHARGING A BATTERY AND BATTERY CHARGER TO ACHIEVE THE PROCESS

FIELD OF THE INVENTION

The present invention relates to a process for charging batteries and particularly a process for charging batteries from AC voltage. The present invention also relates to a battery charger for achieving the process.

BACKGROUND OF THE INVENTION

Batteries have been widely used in electric motor systems, such as electric automobiles. These batteries must be charged or recharged periodically after being depleted. A battery charger is usually used to serve the charging or recharging purpose. Typically, the battery charger is connected to an AC source which supplies a rectified charging voltage, in the form of positive alternations of juxtaposed sine waves varying between a zero voltage and a crest voltage greater than that of the battery.

During each voltage alternation, the battery charger can only provide power when it has a greater voltage than that of the battery, since the voltage of the battery is opposite to that supplied by the battery charger. When the voltage of the battery charger is below the battery voltage, the battery charger is unable to overcome the battery voltage and will hence not supply any power. Therefore, each half-cycle of the source voltage, will pass from an active state, in which the source will feed the battery charger to thus supply power, to a blocked state, which practically has no consumption.

These abrupt changes of load from the source can induce harmonics, which would become more intense if the battery charger is designed to be more powerful to limit the load time. Such harmonics can cause interference with equipments, such as television sets, of other users of the source. Therefore, the maximum level of the battery charges is strictly regulated.

In order to eliminate these harmonics, it is therefore necessary for the battery charger to supply power, even at a low rectified voltage. In other words, the battery charger simulates a passive load when voltage is lacking, in place of the battery. More precisely, a constant passive load is simulated, that is to say, the input current of the battery charger must be proportional to the input voltage. Preferably, to the input current is effectively in phase with the input voltage in order to simulate, on the source side, a purely resistive load and therefore avoid calling on current out of phase, which is a source of losses on the line.

In order to maintain the flow inside the battery charger when the battery charger has a voltage lower than that of the battery, a comparator is provided. The comparator compares the rectified voltage that it produces to that of the threshold of the battery, thus in some manner disconnecting the battery intermittently from the battery charger in the phase where the battery voltage is too low and causing the flow to only go to an inductor which, therefore, does not have a threshold voltage. This inductor is installed in series on one of the two output terminals of the charger and can be looped to the other terminal by the closing of a switch. The battery is connected to the terminals of the switch through a one-way diode to prevent the battery from being short-circuited by the switch. The closed switch therefore provides a tap for the current feeding the inductor. Regulation through cut-off at the level of the switch makes it possible to regulate the current, which is measured so that it will follow the sine wave form of the incoming voltage.

When the switch is open, the inductor provides an over-voltage which makes it possible to overcome the voltage of the battery and thus discharge the voltage stored by the inductor to restart a new cycle. This operation, which makes it possible definitively to raise the voltage of the power supplied at low voltage, is called "boost".

During the phase of a high rectified voltage, the charging current can flow directly from the charger into the battery, since it supplies a voltage exceeding that of the battery voltage.

However, the battery is then equivalent to a short circuit, since it has a fixed voltage regardless of current. The charging current is therefore controlled by a series cut-off switch, of which the percentage of time of closing regulates the current. This operation mode is called "buck".

Such a battery charger is complex, because it includes two assemblies with current regulation. Further, it is necessary to monitor the incoming voltage to activate one while de-activating the other. In addition, since each assembly has its own regulating circuits, the switch from one mode of operation to the other causes an abrupt transition in the regulation which has repercussions on the source.

Even though it is possible to provide a single installation which simultaneously permits the two operations, the inductor must then be over-dimensioned because all power passes through it.

SUMMARY OF THE INVENTION

One object of the present invention is to simplify the charging circuits while avoiding the generation of harmonics to the source.

Another object of the present invention is to provide a process and a battery charger for charging a battery from an alternating current (AC) source where both directions of the voltage of the AC source can provide voltage to the battery.

Accordingly, the present invention relates to a process for charging a battery from an alternating current voltage, in which the charging current is alternatively regulated in the boost and buck modes as a function of the error between the instantaneous value of current and an instantaneous value of a supply current which changes in accordance with a pre-determined form. The charging process of the present invention is characterized in that the modes of operation are controlled by the sign of the current error.

The inventors have discovered that the error sign of the current was completely representative of the appropriate mode of operation and that it was therefore not necessary to provide comparison circuits between the voltage supplied by the battery charger and that of the battery. Further, the two modes of operation can be controlled by a single retroactive loop measuring the current.

Alternatively, the charging process of the present invention comprises the steps of determining a current difference between the instant value of the current and the instant value of a supply current of a pre-determined pattern and regulating the charging current between a boost mode and a buck mode depending on the current difference. The regulating step includes activating one of the boost and buck modes. More specifically, the regulating step comprises activating the buck mode when the current difference is above zero and activating the boost mode when the current difference is below zero.

The present invention also relates to a battery charger comprising two sets of current regulation components operating respectively in boost and buck mode. The two sets of components are designed to be operated by means of an error of current determined between the instant current flowing and an instant supply current, which changes in a predetermined form. The battery charger of the present invention further includes a common loop serving such assemblies and designed to control the respective activation means thereof, according to the sign of the error.

BRIEF DESCRIPTION OF THE DRAWINGS

The present invention will be better understood with the aid of the following description of a battery charger to achieve the process of the present invention, with reference to the attached drawings, in which.

DESCRIPTION OF PREFERRED EMBODIMENTS

Figure 1:
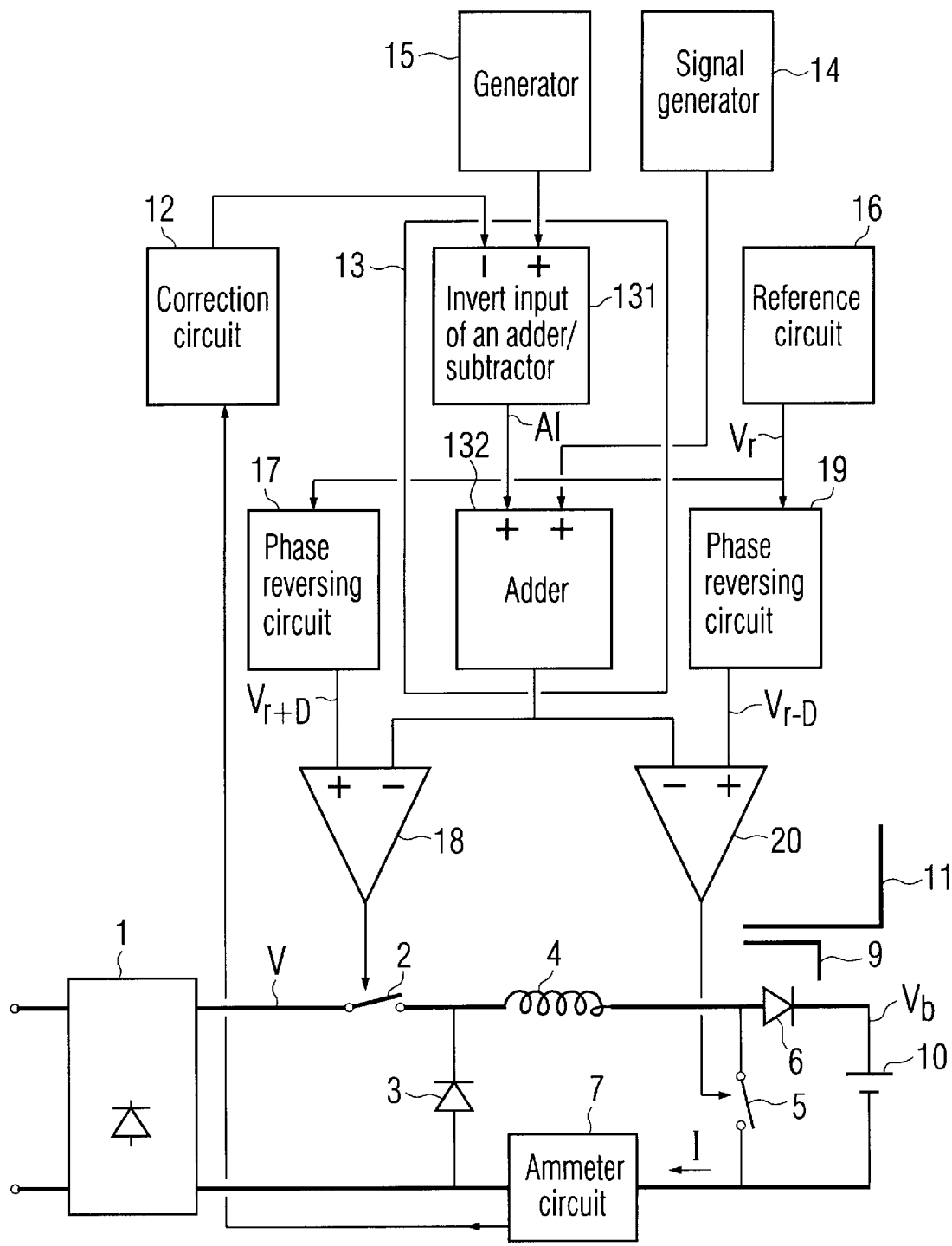
FIG. 1 is a block diagram of the battery charger according to the present invention.

The battery charger of the present invention includes a charging assembly 9 of charging elements and a regulating assembly 11 to regulate the charging assembly 9.

The charging assembly 9 comprises, in order from the AC input source to the output of the battery charger, a double alternating rectifier bridge 1, a "buck" switch 2 in series on the positive wire, a parallel diode 3 for free wheeling, a series inductor 4 on the positive wire, a parallel "boost" switch 5 and a series diode 6 on the positive wire. An ammeter circuit 7 is provided in series on the current return or ground wire opposite the inductor 4 and coupled between one terminal of the switch 5 upstream therefrom and the anode of the diode 3.

The inductor 4, the "boost" parallel switch 5 and the diode 6 constitute a sub-assembly of charging elements for a boost mode, while the "buck" series switch 2, the diode 3 and the inductor 4 constitute an analogous sub-assembly for a buck mode. The common inductor 4 serves to smooth the current.

A battery 10, of a voltage Vb, is connected to the output of the battery charger in opposition to the voltage V of the battery charger.

The regulating assembly 11 comprises a common input loop adapted for retroactive regulation and including a correction circuit 12. The circuit 12 corrects the measurement of the ammeter circuit 7 and effects a low-pass filter based on the instant value of the measured current. The output end of the correction circuit 12 is connected with an invert input of an adder/subtractor 131. The adder/subtractor 131 and an adder 132, which will be further discussed below, constitute an adder/subtractor circuit 13. The adder/subtractor 131 has a direct, non-inverting, input that is connected to a generator 15. The generator 15 generates half sine waves representing an instant reference for the supply current, which progresses in a predetermined manner.

The adder 132 of the adder/subtractor circuit 13 receives the output (AI current error signal) of the adder/subtractor 131. The adder 132 further receives the output of a signal generator 14, which is in the form of saw teeth for a specified peak-to-peak amplitude. The adder 132 can also be an adder/subtractor since the AI signal can be either positive or negative.

The generator 15 is fed in phase with the source (i.e., the output of the rectifier 1) by a connection which is not shown. This involves a simple attenuator receiving the source voltage and being followed by a low-pass filter to eliminate harmonics. Rectification may occur at the beginning as described above, or after filtering as described latter, on a pure 50 Hz wave so that a narrow-band filter may be used.

Two operational amplifiers 18 (buck) and 20 (boost) are provided to control the respective switches 2 and 5. The invert inputs of the two amplifiers 18 and 20 are controlled by the output of the adder 132. The non-inverting inputs of the amplifiers 18 and 20 are controlled by phase reversing circuits 17 and 19.

The phase reversing circuits 17 and 19 each receive a reference voltage Vr from a reference circuit 16 and then supply voltages Vr+D and Vr−D (FIG. 2) to the amplifiers 18 and 20 respectively.

The operation of the battery charger according to the present invention will now be explained in detail.

It should first be noted that, for an instant low input voltage V (V<Vb), and if the parallel switch 5 is permanently open, the current called for from the source can only decrease regardless of the position of the switch 2.

Similarly, when V>Vb and the series switch 2 is permanently closed, the source current called for can only increase, regardless of the position of the switch 5 since the battery 10 is a short circuit from the AC point of view.

Briefly, in the boost mode (V<Vb), the current is lagging with respect to the supply current and must be increased, while in the buck mode (V>Vb), the current is above the supply current and must be decreased. Therefore, the AI error sign between the current measured (7) and the supply current (15) can unambiguously indicate the mode of operation which is necessary.

The sensitivity of the ammeter circuit 7 or, in other words, the amplitude of the measured signal representing the charging current I determines the current value of the charging rate provided, through the supply signal (15). Such supply signal has the form of positive half sine waves of a predetermined amplitude.

The table below indicates the regulation states and the transitions between them.

| State | V | I | AI (I−Ic) | Boost | Buck |
|---|---|---|---|---|---|
| 0 | <Vb |  | = 0 | ACTIVE | inactive (2 closed) |
| (1) | =Vb(+) | ↗ | >0 | deactivation (5 closed) | activation |
| 2 | >Vb |  | =0 | Inactive | ACTIVE |
| (3) | =Vb(−) | ↘ | <0 | Activation | Ineffective (deactivation) |

In State 0, for which V<Vb, the buck mode is ineffective and the boost mode has been activated because the current would decrease if it were in the buck mode. Comparing with State 3 as will be explained below, the measured current I is lower than the supply current and the boost mode is therefore inactive. The series switch 2 for buck in State 3 is permanently closed (buck deactivated).

In the transitional State 1 which follows State 0, the voltage V just exceeds (Vb(+)) Vb. The series switch 2 is constantly closed, and the system freezes. In this case, the measured current I increases above the reference value.

The positive AI error then causes the switching from the boost mode to the buck mode. However, the positive AI error is only capable of rapidly passing the operation to State 2. The parallel switch 5 is permanently opened (boost deactivated) and the buck regulation intervenes by an episodic opening of the series switch 2.

When V falls back to just below (Vb(−)) Vb, the measured current I passes below its supply value (transient State 3) regardless of the action of the buck series switch 2. The buck switch 2 has become incapable of regulating and, therefore, is deactivated (shut down).

The change of sign of the AI error of the current then causes the return to State 0.

The operation of the various circuits according to the present invention will now be explained in detail.

The current regulation, in both directions, is based on the temporary cut-off of current, that is to say, the regulation of its percentage of time of flow respectively in the inductor 4 and the parallel boost switch 5 and in the series buck switch 2.

Figure 2:
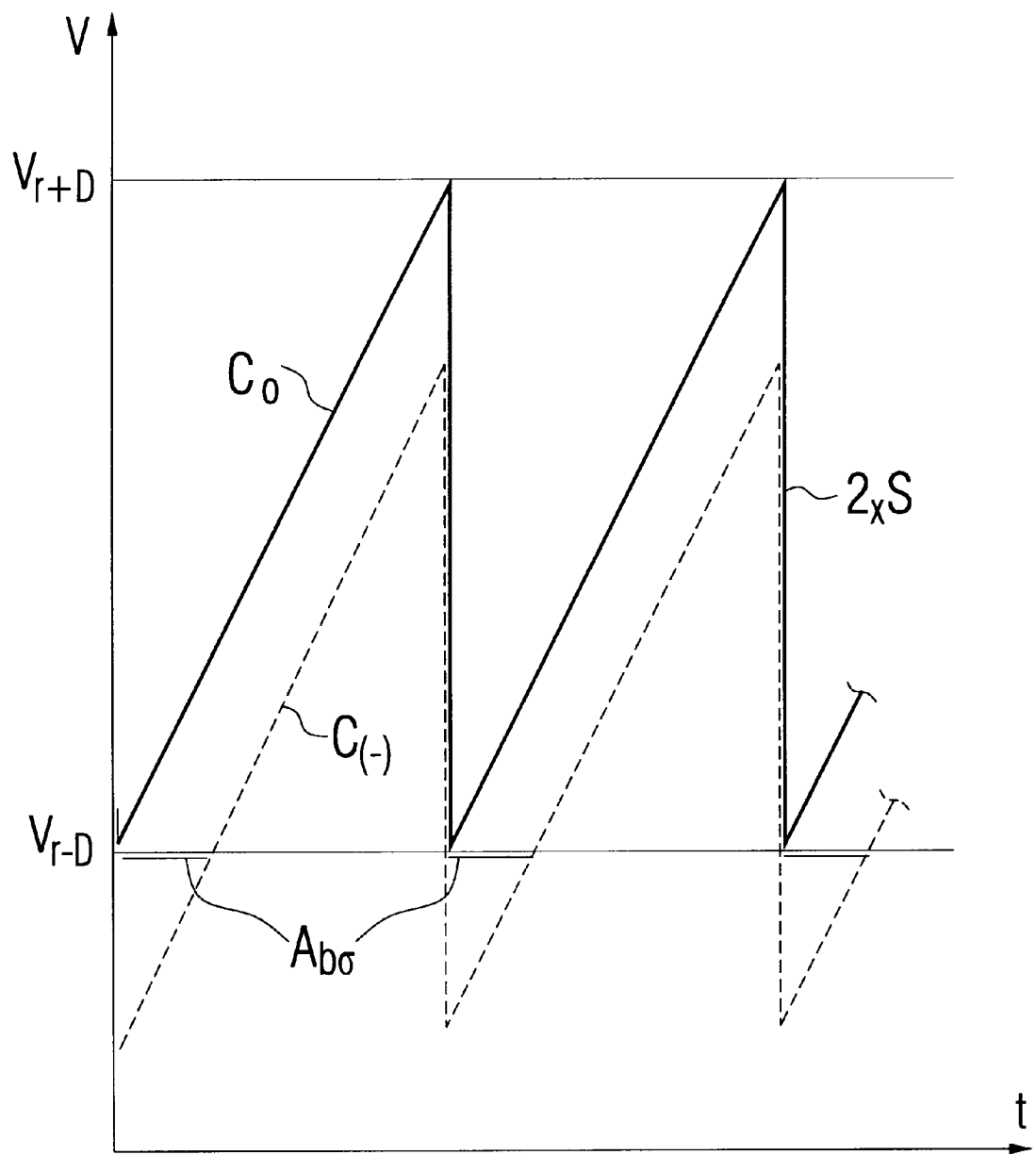
FIG. 2 illustrates the current regulation.

FIG. 2 shows, as a function of time t, the principle of operation of the two modes and the transitions between them.

The phase reversing circuits 17 and 19 supply the upper and lower threshold signals Vr+D and Vr−D respectively, whose voltages are brought to the axis of the ordinates V. The adder/subtractor circuit 13 determines an intermediate signal representing the AI error between the measured current I and the supply current (15), to which the AI error or the saw-tooth signal (14) is adjusted, of a peak-to-peak amplitude 2S, where S=D in this embodiment. More precisely, the amplitude of the AI error is modulated by a saw-tooth value evolving from −D to +D. In practice, the saw tooth (or the AI error) may have a continuous component to polarize the various circuits in a proper operating range, although it can be considered that it is the AI error which modulates the continuous component of the saw-tooth signal.

In the absence of the AI error, the saw tooth is polarized continuously, so that it just reaches Vr+D at its positive peak and Vr−D at its negative peak. Each of the switches 2 and 5 is inactive (control angle or activity percentage zero), that is to say, respectively closed and open. This state is only theoretical, as explained above.

Upon the appearance of a negative AI error, the total saw tooth curve (C0) derives (C−) toward the lower threshold Vr−D and immediately activates it by its negative peaks, which increases the control angle Abo for closing the parallel boost switch 5, zero at rest (continuously open). The buck series switch 2 remains closed (inactive) since its control angle remains at zero. The upper threshold Vr+D has not been reached.

In the opposite direction, a positive AI error causes the saw-tooth curve CO to reach the upper threshold Vr+D and therefore commands operation only in the buck mode (opening of the series switch 2).

As a result, the amplifiers 18 and 20 serve both to activate, according to the error sign AI, their respective mode of operation and to regulate, according to the amplitude of this AI error, the current I in this mode.

In this example, the thresholds for activation of the two modes of operation are, in fact, functionally confused (S=D), even if the presence of the saw tooth requires that they be physically differentiated. This is because that one mode is always activated once the balance is broken or, in other words, one deactivates one of the modes when the other is activated. Nevertheless, it would have been possible to provide for a margin of AI errors which was inactive. In other words, the boost and buck modes would have different areas of operation (S<D). Similarly, it could be envisaged that they recover partially (S>D), so as to reduce the AI error and better assure transitions from one mode of operation to the other.

It will be noted, furthermore, that the regulation can be accomplished by a process according to one or the other branches of an alternator connected to the mode of operation of the AI error. In effect, what is in fact determined is the difference between the signal at the saw tooth (14) and each of the two thresholds (17), (19) and, in the above example, the AI error modulates the saw-tooth signal (15), which thus "floats" with respect to the fixed thresholds (17, 19).

The dual solution would consist in modulating the two thresholds (17, 19) by the AI error to make them float with respect to the saw-tooth signal (15), therefore unchanging. The operational amplifiers 18 and 20 therefore, in fact, add/subtract in cooperation with the circuit 13. The circuit 13 would therefore be displaced and duplicated to intervene at the output of the circuits 17 and 19 to, therefore with a reversal of the sign of the AI error, compensate for the change of input at amplifiers 18 and 20. Briefly stated, the gap would be used to transform the AI error into two errors for the boost and buck modes, respectively, mutually separated by a specified value 2D=2S, and the length of the current pulses would be regulated in each mode by a comparison of the gap error considered and an alternative amplitude signal 2S, equal to the mutual difference.

In other modes of embodiment, it may occur, as indicated above, that there are one or more thresholds which are functionally separated (boost and buck areas which are separated or partially mutually covered) without this separation being connected to a saw-tooth signal.

For example, a signal processing microprocessor (DSP) might order the change from boost and buck operation according to the AI error current sign (with a possible amplitude gap), while it would regulate current according to the amplitude of this AI error.

The corresponding command could then trigger a timer, with an increasing output from a counter, equivalent to the saw tooth which has become useless. Similarly, a current regulation by a variable resistance element would need no saw tooth signal.

The foregoing description is only illustrative of the principle of the present invention. It is to be recognized and understood that the invention is not to be limited to the exact configuration as illustrated and described herein. Accordingly, all expedient modifications readily attainable by one versed in the art from the disclosure set forth herein that are within the scope and spirit of the present invention are to be included as further embodiments of the present invention. The scope of the present invention accordingly is to be defined as set forth in the appended claims.

What is claimed is:

1. A process for charging a battery from an alternating current voltage which provides voltage to the battery in each direction, wherein the charging current is regulated alternatively in a boost and buck mode as a function of an error (AI) between the instant value of the current and an instant value of a supply current following a pre-determined pattern, wherein the activation of the modes of operation is controlled according to the sign of the error of the current (AI), and wherein the current is regulated in each mode by regulating the size of current impulses.

2. The charging process of claim 1, wherein one of the operation modes is deactivated when the other is activated.

3. The charging process of claim 1, wherein the error is transformed into two errors for the boost and buck modes respectively, mutually separated by a specific value, and the length of the current impulses is regulated in each mode by a comparison between the separation error considered and an alternating amplitude signal equal to the mutual separation.

4. A process for charging a battery from an alternating current voltage which provides voltage to the battery in each direction, wherein the charging current is regulated alternatively in a boost and buck mode as a function of an error (AI) between the instant value of the current and an instant value of a supply current following a pre-determined pattern, wherein the activation of the modes of operation is controlled according to the sign of the error of the current (AI), and wherein a saw-tooth shape is imposed on the regulation signal.

5. A process for charging a battery from an alternating current voltage which provides voltage to the battery in each direction, wherein the charging current is regulated alternatively in a boost and buck mode as a function of an error (AI) between the instant value of the current and an instant value of a supply current following a pre-determined pattern, wherein the activation of the modes of operation is controlled according to the sign of the error of the current (AI), and wherein a low-pass filter is applied to the instantaneous values of the current measured.

6. A battery charger used in a process for charging a battery from an alternating current voltage which provides voltage to the battery in each direction, wherein the charging current is regulated alternatively in a boost and buck mode as a function of an error (AI) between the instant value of the current and an instant value of a supply current following a pre-determined pattern, and wherein the activation of the modes of operation is controlled according to the sign of the error of the current (AI), the battery charger comprising:

a first and a second sub-assemblies operating respectively in boost and buck modes;

a circuit for determining an error between an instantaneous current flow and an instantaneous current input, which develops in a pre-determined manner, and a common loop for feeding the sub-assemblies and controlling respective regulating circuits to activate the sub-assemblies, depending on the sign of the error.

7. The battery charger of claim 6, wherein each sub-assembly comprises a regulating switch which cuts off the current with a controlled conducting time, depending upon the error, by means of a regulating circuit of the common loop.

8. The battery charger of claim 7 further comprising a circuit for generating a signal (14) in the form of a saw tooth and with a specified peak-to-peak amplitude, a gap circuit (17, 19) for supplying two reference signals for boost and buck of levels which are mutually separated according to the amplitude, and an adder-subtractor circuit (132, 18, 20) for determining the difference between the saw-tooth signal (14) and the respective reference signals (17; 19) and adding it to the error (131) in order to control the respective switches (5; 2).

9. The battery charger of claim 7 further comprising a circuit for measuring the current flowing coupled on a current feedback connection and upstream of the boost switch.

10. The battery charger of claim 8 further comprising a circuit for measuring the current flowing coupled on a current feedback connection and upstream of the boost switch.

* * * * *